(12) United States Patent
Cheung et al.

(10) Patent No.: US 8,627,997 B2
(45) Date of Patent: Jan. 14, 2014

(54) UNIVERSAL RADIO FREQUENCY SHIELD REMOVAL

(75) Inventors: Dason Cheung, Fremont, CA (US);
Simon Medina Sotelo, Zapopan (MX);
Enrique Avelar, Guadalajara (MX);
Omar Garcia Lopez, Guadalajara (MX)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/356,385

(22) Filed: Jan. 23, 2012

(65) Prior Publication Data

US 2012/0118940 A1 May 17, 2012

Related U.S. Application Data

(63) Continuation of application No. 12/750,450, filed on Mar. 30, 2010, now Pat. No. 8,113,411.

(51) Int. Cl.
*B23K 1/018* (2006.01)

(52) U.S. Cl.
USPC ............................ 228/191; 228/212; 228/264

(58) Field of Classification Search
None
See application file for complete search history.

(56) References Cited

U.S. PATENT DOCUMENTS

| | | | | |
|---|---|---|---|---|
| 3,382,564 A * | 5/1968 | Gallentine | ................ | 228/173.5 |
| 3,873,144 A * | 3/1975 | Diepeveen | .................... | 294/183 |
| 3,938,722 A * | 2/1976 | Kelly et al. | .................... | 228/1.1 |
| 3,957,185 A * | 5/1976 | Kauffman et al. | ............ | 228/106 |
| 4,066,204 A * | 1/1978 | Wirbser et al. | ................ | 228/264 |
| 4,295,596 A * | 10/1981 | Doten et al. | ............ | 228/180.21 |
| 4,518,110 A * | 5/1985 | Breske et al. | ................ | 228/20.5 |
| 4,528,746 A * | 7/1985 | Yoshimura | ....................... | 29/743 |
| 4,703,133 A | 10/1987 | Miller | | |
| 4,787,548 A * | 11/1988 | Abbagnaro et al. | ........... | 228/6.2 |
| 4,813,589 A * | 3/1989 | Palmer et al. | ................ | 228/119 |
| 4,875,614 A * | 10/1989 | Cipolla et al. | ................ | 228/5.5 |
| 5,065,933 A * | 11/1991 | Basavanhally | ................ | 228/102 |
| 5,281,794 A * | 1/1994 | Uehara et al. | ................ | 219/243 |
| 5,351,876 A * | 10/1994 | Belcher et al. | ........... | 228/180.22 |
| 5,415,331 A * | 5/1995 | Lin | ............................... | 228/213 |
| 5,419,481 A * | 5/1995 | Lasto et al. | .................... | 228/6.2 |
| 5,447,266 A * | 9/1995 | Misono | ........................ | 228/102 |
| 5,575,417 A * | 11/1996 | Allison et al. | ................ | 228/119 |
| 5,579,979 A * | 12/1996 | Kurpiela | ........................ | 228/6.2 |
| 5,669,545 A * | 9/1997 | Pham et al. | .................... | 228/1.1 |
| 5,909,838 A * | 6/1999 | Jimarez et al. | ................ | 228/125 |
| 5,934,542 A * | 8/1999 | Nakamura et al. | ........... | 228/44.7 |

(Continued)

OTHER PUBLICATIONS

Derwent-Acc-No. 1989-044329 which corresponds to JP-63-318133A.*

*Primary Examiner* — Kiley Stoner
(74) *Attorney, Agent, or Firm* — Haverstock & Owens LLP

(57) ABSTRACT

Apparatus and methods for removing components soldered to a printed circuit board (PCB). Embodiments presented generally include a contact plate having a component specific platform offset from the contact plate body. The offset platform may be substantially identical in size and shape as the component to be removed. Accordingly, contact between a heated platform and component may allow for conductive heating to occur based on contact with the component. Thus, forced air or convective heating of the component does not occur such that solder joint defects in adjacent components may be prevented. A vacuum retention port may be provided at an interface of the platform and component when in contact. The vacuum retention port may allow the freed component to be removed from the PCB using vacuum to hold the freed component to the platform. Also, apparatus for automation of a process according to the forgoing are presented.

11 Claims, 13 Drawing Sheets

(56) References Cited

U.S. PATENT DOCUMENTS

| | | | |
|---|---|---|---|
| 6,008,476 A * | 12/1999 | Neiconi et al. | 219/388 |
| 6,126,059 A * | 10/2000 | MacKay et al. | 228/9 |
| 6,257,478 B1 * | 7/2001 | Straub | 228/6.2 |
| 6,321,971 B1 * | 11/2001 | Jin et al. | 228/6.2 |
| 6,360,640 B1 * | 3/2002 | Cote | 83/287 |
| 6,386,432 B1 * | 5/2002 | Jin et al. | 228/245 |
| 6,471,110 B1 * | 10/2002 | Luechinger et al. | 228/102 |
| 6,572,010 B2 * | 6/2003 | Dordi et al. | 228/206 |
| 6,820,792 B2 * | 11/2004 | Kim et al. | 228/9 |
| 7,187,060 B2 | 3/2007 | Usui | |
| 7,189,083 B2 * | 3/2007 | Seidler et al. | 439/83 |
| 7,347,347 B2 * | 3/2008 | Kira et al. | 228/1.1 |
| 7,640,649 B2 * | 1/2010 | Fukaya et al. | 29/603.02 |
| 7,836,583 B2 * | 11/2010 | Amurao et al. | 29/762 |
| 7,971,350 B2 | 7/2011 | Joshi | |
| 2001/0017313 A1 * | 8/2001 | Mays et al. | 228/264 |
| 2002/0030089 A1 * | 3/2002 | Leu | 228/248.1 |
| 2002/0066767 A1 * | 6/2002 | Takahashi et al. | 228/110.1 |
| 2002/0079350 A1 * | 6/2002 | Terada et al. | 228/103 |
| 2002/0084307 A1 * | 7/2002 | Ruszowski | 228/51 |
| 2002/0130164 A1 * | 9/2002 | Matsuki et al. | 228/206 |
| 2003/0057260 A1 * | 3/2003 | Hembree et al. | 228/110.1 |
| 2003/0136812 A1 * | 7/2003 | Seidler | 228/179.1 |
| 2003/0136818 A1 * | 7/2003 | Seidler | 228/249 |
| 2003/0160084 A1 * | 8/2003 | Higashiyama | 228/1.1 |
| 2004/0041003 A1 * | 3/2004 | Higashiyama | 228/110.1 |
| 2004/0178500 A1 | 9/2004 | Usui | |
| 2004/0206805 A1 * | 10/2004 | Kimura et al. | 228/264 |
| 2004/0211812 A1 * | 10/2004 | Hizukuri et al. | 228/1.1 |
| 2005/0109817 A1 * | 5/2005 | Reiber | 228/49.6 |
| 2006/0022019 A1 * | 2/2006 | Terada et al. | 228/105 |
| 2007/0163802 A1 | 7/2007 | Monthei | |
| 2011/0079634 A1 * | 4/2011 | Lee et al. | 228/264 |

\* cited by examiner

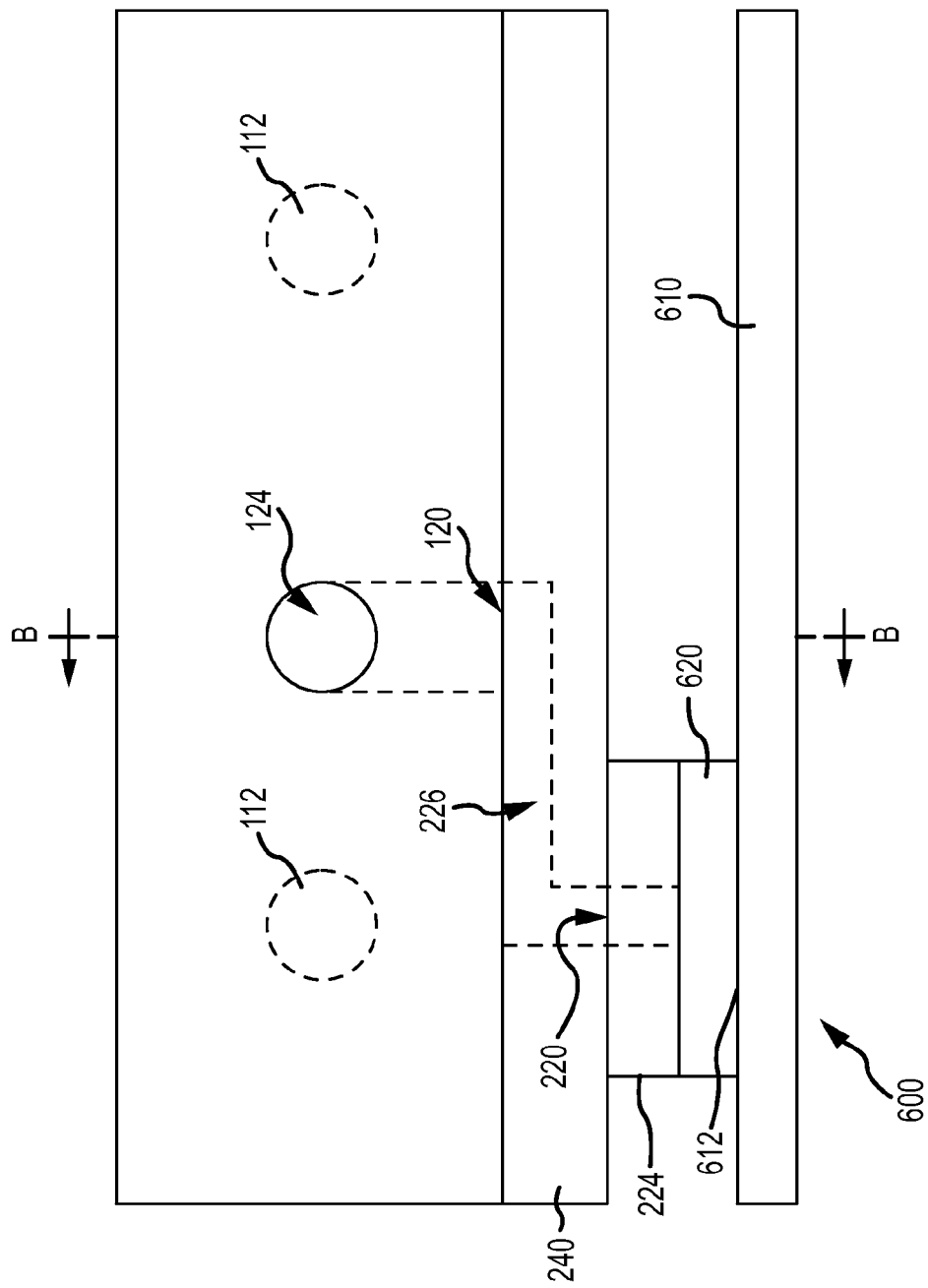

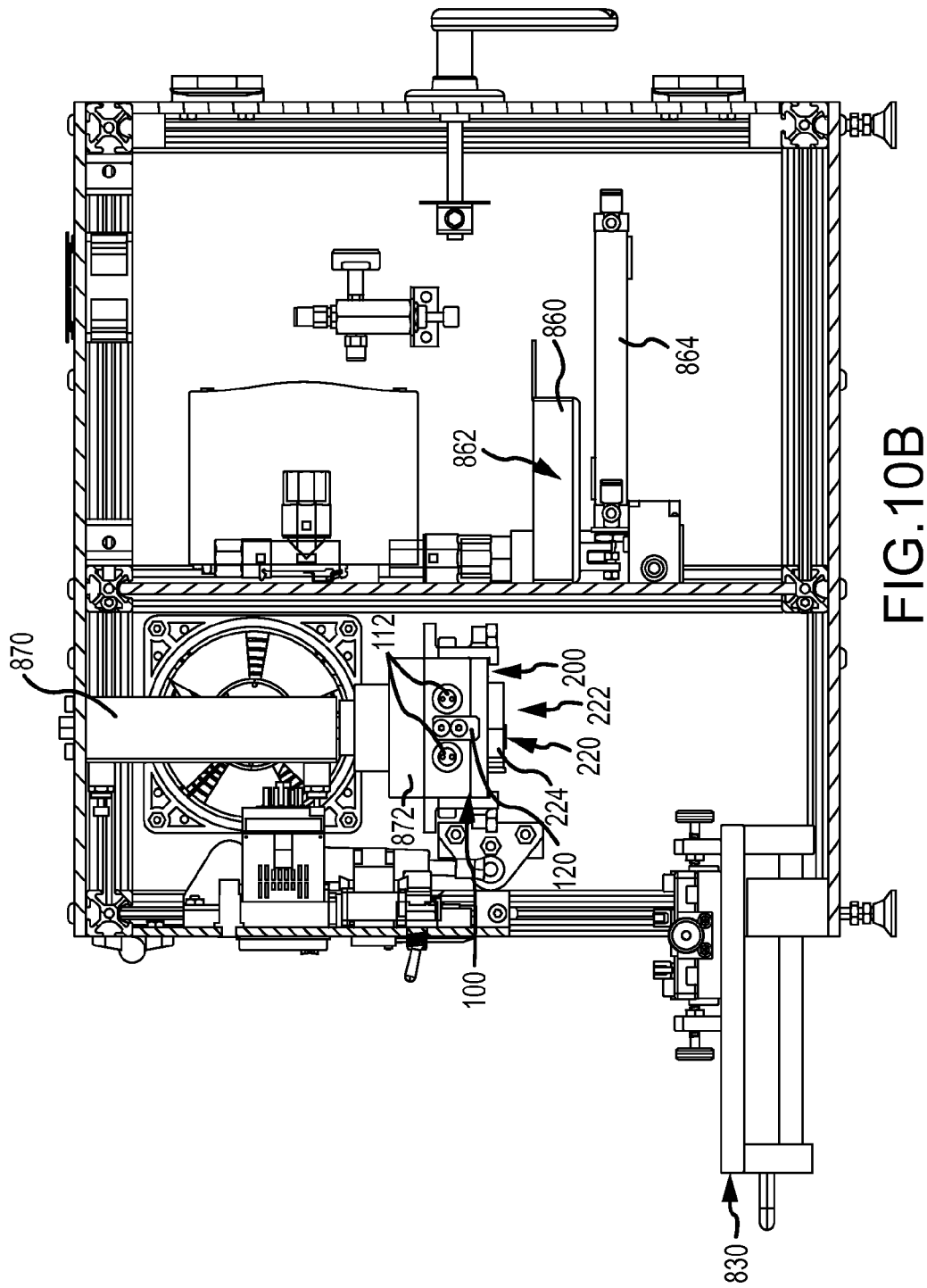

UNIVERSAL RADIO FREQUENCY SHIELD REMOVAL

This application is a continuation of Ser. No. 12/750,450, filed Mar. 20, 2010 now U.S. Pat. No. 8,113,411.

BACKGROUND

When assembling electronic devices, it is common to solder components to a printed circuit board (PCB) to attach components to the PCB. The soldering of components not only attaches the components to the PCB but may also be used to establish an electrical connection between the PCB and an electronic component. In this regard, both electrically coupled as well as non-electrically coupled components may be soldered to the PCB in order to maintain a position on the PCB.

Often components to be affixed to a PCB are positioned adjacent to the PCB with solder being positioned between the component and PCB. The assembly may then be heated such that the solder melts. When cooled, the solder may in turn solidify and attach the component to the PCB. This process of melting solder to affix a component to a PCB is commonly referred to as reflow.

During the assembly process of electronic devices, various tests may be conducted to determine whether the components that have been attached to the PCB are operative and properly attached. Examples of processes that may be conducted on a PCB to determine correct placement, attachment, and operation of components include function node testing and x-ray inspection. Based on the results of these tests, it may be necessary to remove components from the PCB due to a faulty attachment or other detected process defects. The removal of components may be necessary in order to replace a malfunctioning component, reattach a component, or access other components on the PCB. This process may be commonly referred to as rework.

For example, many PCBs include electro-magnetic (e.g., radio-frequency (RF)) shields that cover other components attached to the PCBs. Particularly in the field of electrical communication devices, RF shields may be employed to protect sensitive components from interference from RF energy. In this respect, many sensitive components may be located below an RF shield that is in turn attached to a PCB. Therefore, if one of the components contained under the RF shield needs to be removed or the RF shield itself needs replaced, the RF shield may need to be removed.

Existing methods for removal of RF shields often involve heating the RF shield with forced hot air to melt the solder attachment of the RF shield to the PCB. However, due to the difficulty in controlling a forced hot air process, directing the flow of hot air, the forced hot air heating of the RF shield may also create problems with other components and their solder joints. For example, the direction of the forced hot air may be difficult to control. As such, the forced hot air may be directed to portions of the PCB that are not to be reworked. Furthermore, the amount of heat transferred to the PCB is difficult to control in a forced hot air process. The temperature of the air existing the forced hot air source may be difficult to regulate and the amount of heat transferred may depend on many variables such as the temperature of the air existing the source, the distance of the source from the component, the flow rate of air existing the source, and other factors that may be variable and be difficult to control. The use of forced hot air may cause unintended reflow of adjacent components and may lead to solder joint defects in these adjacent components. These defects may occur to components adjacent to the RF shield that are not to be removed from the PCB. Examples include causing unintended reflow, delamination, plate lifting, wetting problems, dewetting problems, and other potential defects in components adjacent to the RF shield that has been heated with forced hot air. These defects may occur for components adjacent to the RF shield or components contained underneath the RF shield.

In addition to the potential for solder joint defects when using forced hot air to remove an RF shield, the process may be tedious and require a relatively long cycle time to remove the RF shield. The process generally involves an operator manipulating a forced hot air gun in order to heat the RF shield. The operator may be required to take great care to diminish the potential for solder joint defects in adjacent components. As such, the cycle time may be relatively long for each RF shield that needs to be removed. For instance, the cycle time for removing an RF shield with forced hot air heating may take between six to eight minutes and may require highly trained, certificated operators to operate the machine to reduce the potential for solder joint defects. Additionally, the equipment costs for the equipment necessary to perform forced hot air RF shield removal may be high.

Further still, once the RF shield has been heated by forced hot air heating, it is still necessary to remove the RF shield from the PCB. Existing methods for removal of an RF shield once heated by forced hot air heating include vacuum pick up and removing the RF shield manually by grasping (e.g., with tweezers). In this regard, the removal the RF shield once heated may be tedious and require high skill in order to prevent damage to the remainder the PCB when removing the RF shield with tweezers as adjacent components may also be heated such that they are susceptible to being damaged when manipulating portions of the PCB with tweezers.

SUMMARY

A first aspect of the present invention includes an apparatus for removing a component attached to a printed circuit board (PCB) from the PCB. The apparatus includes a heating element, a contact plate in thermal communication with the heating element, and a vacuum retention port extending through the contact plate and operative to selectively communicate with a vacuum source. The contact plate is contactable with the component such that when the contact plate is in contact with the component the heating element heats the component and the vacuum retention port is covered by the component.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the component may be an electro-magnetic shield operative to protect components on the PCB from electro-magnetic interference. In one embodiment, the component may be a radio-frequency (RF) shield operative to protect components on the PCB from radio-frequency (RF) interference.

In another embodiment, the heating element may include a vacuum port in communication with the vacuum retention port. The contact plate may be removably attachable to the heating element and may include a platform extending from the contact plate. The platform may have a substantially identical profile as the component. In this regard, only the platform may contact the component when the contact plate is in contact with the component. The vacuum retention port may terminate at an interface between the platform and the component when the contact plate is in contact with the component.

In one embodiment, the contact plate may be chosen from among a plurality of contact plates and the plurality of contact plates may include different platforms having different profiles for different components to be removed from the PCB. The contact plate may be clamped to the heating element using at least one clamping mechanism.

The apparatus may also include a temperature controller operative to control the heating element to maintain a predetermined temperature of the contact plate. Additionally, the apparatus may include a vacuum controller operative to control a vacuum at the vacuum retention port to selectively establish a vacuum at the vacuum retention port. In another embodiment, the apparatus includes a PCB holder operative to hold the PCB stationary when the contact plate is in contact with the component.

A second aspect of the present invention includes an automated system for removing a component attached to a printed circuit board (PCB) from the PCB. The system includes a heating element, a contact plate removably attached to the heating element and in thermal communication with the heating element, and a vacuum retention port extending through the contact plate and in selective communication with a vacuum source such that a vacuum is selectively established at the vacuum retention port. Furthermore, the system includes an actuator engaged with the heating element and operative to move the contact plate with respect to the PCB between a non-contacting position and a contacting position. When in the contacting position the contact plate contacts the component and the vacuum retention port is located at an interface between the contact plate and the component and the component covers the vacuum retention port. The system also includes a PCB holder operative to retain the PCB. When in the contacting position the contact plate heats the component and the vacuum is maintained at the vacuum retention port, such that when the contact plate is moved to the non-contacting position the component is held against the contact plate by the vacuum and removed from the PCB.

A number of feature refinements and additional features are applicable to the second aspect. These feature refinements and additional features may be used individually or in any combination. As such, each of the following features that will be discussed may be, but are not required to be, used with any other feature or combination of features of the second aspect.

In one embodiment, the system may also include a controller operative to control the heating element to maintain a predetermined temperature at the contact plate, control the vacuum source such that vacuum may be selectively established at the vacuum retention port, and control the actuator to position the contact plate between the non-contacting position and the contacting position. Additionally, the system may include a slide to which the PCB holder is attached. The slide may be operative to move with respect to the contact plate from a loading position to a work position. When in the loading position, the PCB holder may be accessible by an operator such that a PCB may be loaded onto the PCB holder. When in the work position, the PCB may be aligned with the contact plate such that actuation of the actuator results in placement of the contact plate in the contacting position.

In one embodiment, the controller may be operative to control the actuator, in response to movement of the slide to the work position, to position the contact plate from the non-contacting position to the contacting position, maintain the contact plate in the contacting position for a predetermined amount of time, and after the predetermined amount of time, move the contacting plate to the non-contacting position while controlling the vacuum source to establish a vacuum at the vacuum retention port.

Additionally, the system may include a component disposal drawer operative to move with respect to the contact plate from a closed position to an open position. When the component disposal drawer is in the open position, upon termination of the vacuum at the vacuum retention port, the component may separate from the contact plate and may be disposed within the component disposal drawer.

A third aspect of the present invention includes a method for removing a component attached to a PCB from the PCB. The method involves contacting the component with a contact plate in thermal communication with a heating element such that a vacuum retention port extending through the contact plate is covered by the component, melting solder attaching the component to the PCB in response to the contacting, creating a vacuum at the vacuum retention port such that the component is held against the contact plate by the vacuum, and moving the contact plate with respect to the PCB during the creating such that the component is retained on the contact plate and removed from the PCB.

A number of feature refinements and additional features are applicable to the third aspect. These feature refinements and additional features may be used individually or in any combination. As such, each of the following features that will be discussed may be, but are not required to be, used with any other feature or combination of features of the third aspect.

In one embodiment, the component may be an electromagnetic shied. For example, the electro-magnetic shield may be a radio-frequency (RF) shield.

In another embodiment, the contact plate may be a customized removable plate having a platform corresponding to a profile of the component. Only the platform may contact the component when the contact plate is in contact with the component. The method may further include selecting a contact plate from a plurality of different contact plates. Additionally, the method may involve removably attaching the contact plate to the heating element. The removably attaching may includes clamping the contact plate to the heating element using a quick release mechanism.

A fourth aspect of the present invention includes an apparatus for removing a component attached to a printed circuit board (PCB) from the PCB. The apparatus includes a heating element and a contact plate in thermal communication with the heating element. The contact plate is operative to contact only the component such that the contact plate contacts substantially all of an exposed area of the component such that heat is conducted directly from the contact plate to the component.

A number of feature refinements and additional features are applicable to the fourth aspect. These feature refinements and additional features may be used individually or in any combination. As such, each of the following features that will be discussed may be, but are not required to be, used with any other feature or combination of features of the fourth aspect.

For instance, in one embodiment, the contact plate may include a platform extending from the contact plate that has a substantially identical profile as the component. Additionally, the platform may include a vacuum retention port extending through the contact plate. The vacuum retention port may be operative to selectively communicate with a vacuum source such that the vacuum retention port is covered by the component when the platform contacts the component.

BRIEF DESCRIPTION OF THE DRAWINGS

FIGS. 10A-B are section views taken along section line 10 in FIG. 9 showing a PCB holder in a work position and loading position, respectively.

DETAILED DESCRIPTION

Figure 1:
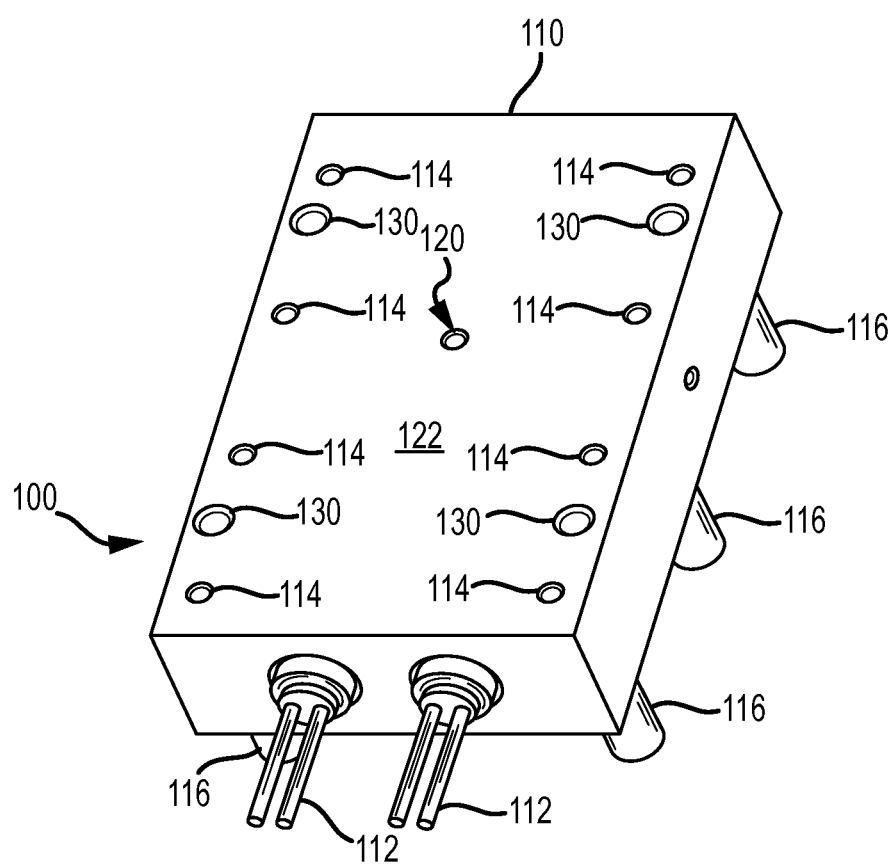
FIG. 1 is a perspective view of a heating element assembly.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

The embodiments described herein generally include apparatus and methods that may be utilized to remove a component from a PCB. The component to be removed may be any component attached to the PCB by way of a solder connection. Examples include integrated circuit devices and the like. In one embodiment, the component to be removed is an electro-magnetic shield used to protect components on the PCB from electro-magnetic energy. For instance, the component may be a radio-frequency (RF) shield that may or may not be covering additional components.

The component to be removed may be affixed to the PCB by way of a solder connection such that upon melting of the solder comprising the solder connection, the component may be removed from the PCB without damaging the component or the PCB. To accomplish melting of the solder forming the solder connection between a component and a PCB, embodiments disclosed herein may include a contact plate having a platform that may be of the same profile as the component to be removed. In this regard, the contact plate may be brought into contact with the component such that only the component is contacted by the platform of the contact plate. As the platform of the contact plate may be of the same profile as the component, the component to be removed may be the only portion of the PCB contacted by the contact plate. That is, the component, when attached to the PCB may have an exposed area that is contacted by the contact plate. The exposed area of the component may correspond to the component's footprint or profile on the PCB. The contact plate may be adapted to contact substantially all of the component's exposed area without contacting any other component of the PCB or the PCB itself. In this regard, heat may be transferred directly to the component by conductive heat transfer at the point of contact. This may prevent or alleviate the problem of heat being transferred into other components which are not to be removed from the PCB. Thus, the embodiments presented herein may facilitate prevention of solder joint defects in adjacent components to the component that is to be removed.

In addition to providing a contact plate having a platform matching the profile of a component to be removed, embodiments presented below may include a vacuum retention port that terminates at an interface between a platform and a component when in contact with each other. The vacuum retention port may allow for a component freed from the PCB (i.e., after having the solder connection melted) to be retained on the platform which is in contact with the component. Thus, the contact plate may be moved with respect to the PCB such that the component remains held against the platform such that as the contact plate is moved away from the PCB the component remains held against the platform. That is, the freed component may be retained on the platform and effectively removed from the PCB.

Figure 2:
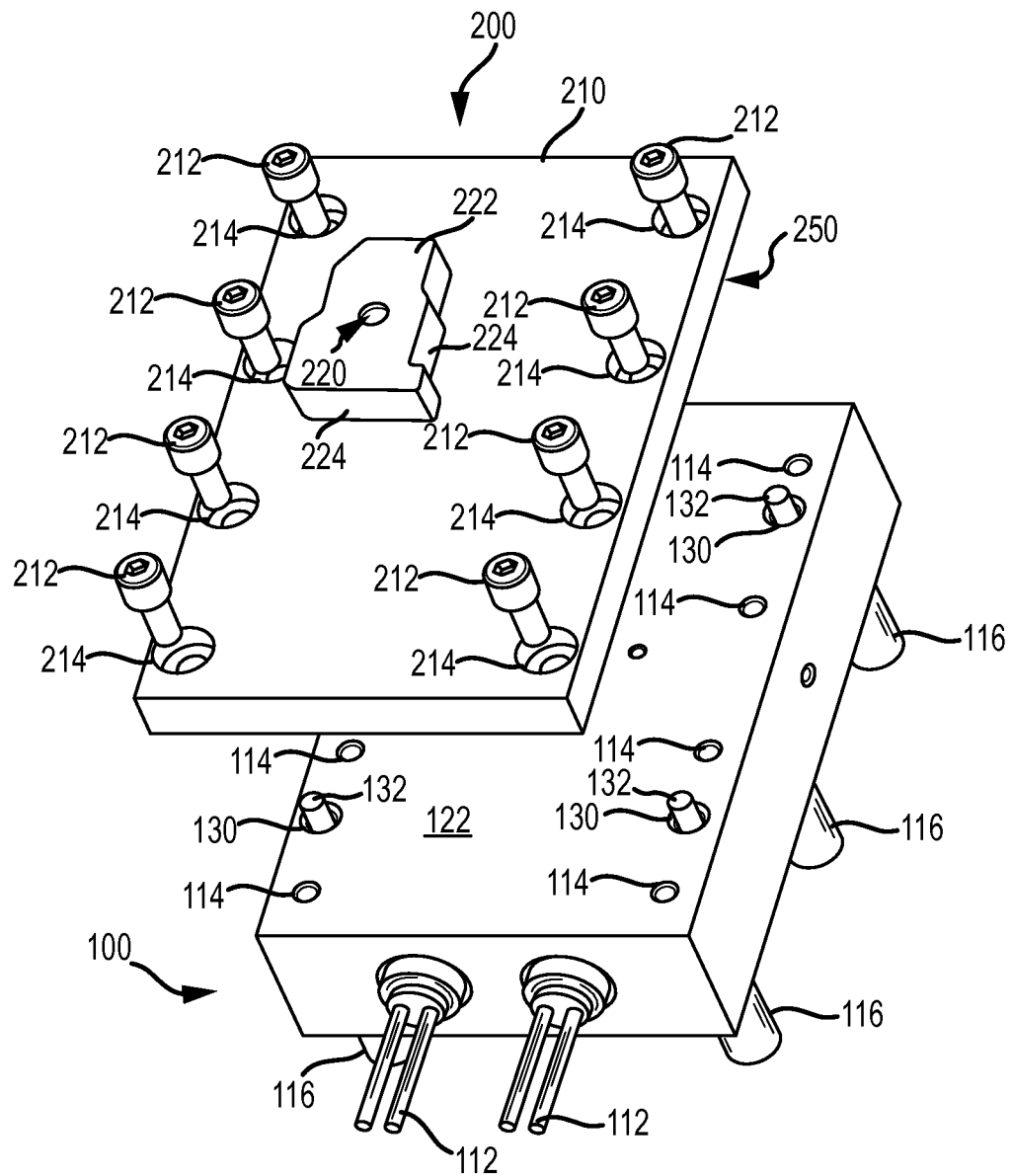
FIG. 2 is an exploded perspective view of a heating element assembly and contact plate assembly.

With respect to FIGS. 1 and 2, a heating element assembly 100 and a contact plate assembly 200 are shown. The heating element assembly 100 may generally include a heating element body 110. At least one heating element 112 may be disposed within the heating element body 110. In the embodiment depicted in FIG. 1, two heating elements 112 are disposed within the heating element body 110. The heating element body 110 may conduct heat throughout the heating element body 110 such that substantially the entire body of the heating element body 110 is heated to approximately the same temperature. The heating elements may be any type of heating element known in the art (e.g., any type of electrical heating element). In one embodiment, the heating elements 112 may be resistive electric heaters. The heating elements may be controlled by a temperature controller such that a predefined temperature of the heating element body is maintained. The control of the temperature may be automated or rely on manual control by an operator.

The heating element body 110 also may include structures or features that allow a contact plate 210 of the contact plate assembly 210 to be attached to the heating element. These structures and features may include fasteners, sliding connections, clamping connections, interference connections, or other known means of attachment. As explained below it may be advantageous to allow for removal of the contact plate 210 from the heating element body 110. In one embodiment, the heating element body 110 includes attachment holes 114 that may be used to attach the contact plate 210 as will be described below.

The heating element body 110 may also include a vacuum port 120 that may extend through the heating element body 110. The vacuum port 120 may terminates at a face 122 of the heating element body 110. The face 122 of the heating element body may be adjacent to the contact plate 210 such that when the contact plate 210 is attached to the heating element body 110, the contact plate 210 may contact the face 122. In this regard, the vacuum port 120 may terminate at an interface between the heating element body 110 and the contact plate 210 when attached. The face 122 of the heating element body 110 & face 250 of the contact plate 210 may be flush with one another when in contact. As such, either or both of the faces 122 or 250 may include an appropriate surface finish or texture to avoid vacuum loss when a vacuum is introduced as will be further discussed below.

The heating element body 110 may further include insulators 116. In one embodiment, the insulators 116 may be ceramic insulators. In this regard, the heating element body 110 may be attached to a housing body or other support without transferring a substantial amount of heat to other parts of a device incorporating the heating element body 110. In other words, insulating material may be provided on the heating element body 110 to thermally isolate the heating element body 110 from other portions of a device.

The contact plate 210 may include attachment features corresponding to the attachment features of the heating element body 110. In the embodiment depicted in FIG. 2, the contact plate 210 may include through holes 214 that may correspond to and be aligned with the attachment holes 114 provided in the heating element body 110. The contact plate assembly 200 may also include fasteners 212 that extend through the through holes 214 and engage the attachment holes 114. For instance, the fasteners 212 may include bolts that extend through the through holes 214 and thread into threaded attachment holes 114. In this regard, the contact plate 210 may be affixed to the heating element body 110. The heating element body 110 may include guide pins 132 that may be disposed in alignment hoes 130 that correspond with alignment holes located on the contact plate 210 to assist in alignment of the contact plate 210 with the heating element body 110 to facilitate prevention of misalignments or inverted plates.

Figure 3:
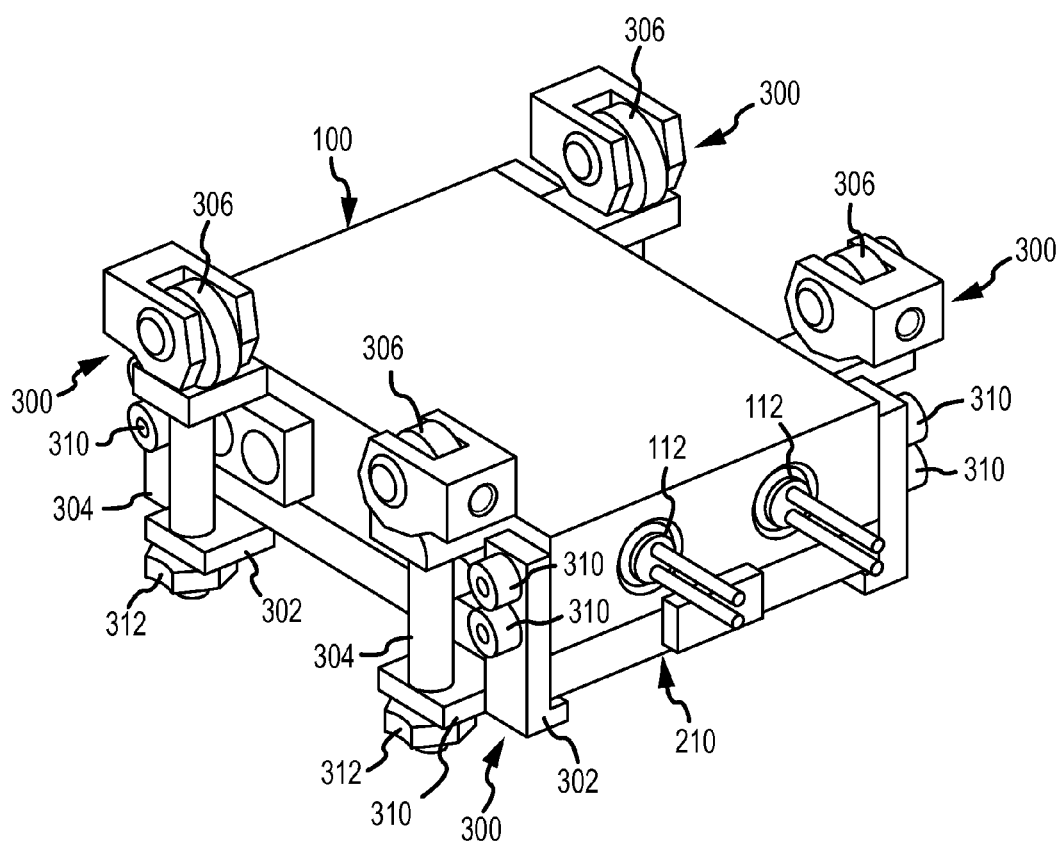
FIG. 3 is an alternative embodiment of a heating element assembly.

In an alternative embodiment depicted in FIG. 3, one or more clamping mechanisms 300 may be attached to a heating element body 110. In this embodiment, the clamping mechanisms 300 may be operative to clamp the contact plate 210 to the heating element body 110. In this regard, the attachment and detachment of the contact plate 210 to the heating element body 210 may be simplified such that contact plate changes may occur more quickly and be easier for an operator to accomplish. The clamping mechanism 300 may be attached to the heating element body 110 by attachment bolts 310. A clamp end 302 may be provided at the end of a clamping rod 304. The clamping rod 304 may be affixed at the other end to a cam 308 that may be actuated with a lever arm. Upon actuation of the cam 308 with the lever arm, the clamping rod 304, along with the clamp end 302 may be drawn toward the heating element body 110 such that the contact plate 210 disposed between the clamp end 302 and the heating element body 110 may be held in place against the heating element body 110. An adjustment nut 312 may be provided at an end of the clamping rod 304 to adjust the location of the clamp end 302 to produce different amounts of clamping force on the contact plate 210.

When the heating element body 110 and the contact plate 210 have been attached, the vacuum port 120 defined in the heating element body 110 may be brought into communication with a vacuum retention port 220 that extends through the contact plate 210. As such, a vacuum exposed to the vacuum port 120 in the heating element body 110 may in turn be communicated to the vacuum retention port 220 as will be described further below.

In any regard, the contact plate 210 may be attached to the heating element body 110 such that the contact plate 210 is also heated by the heating element 112. The contact plate 210 may also include a platform 222 defined by platform sidewalls 224 that extend away from the contact plate 210 in a direction opposite from the heating element body 110. In this regard, the platform 222 may extend from the contact plate 210 such that the platform 222 is offset from the remainder of the contact plate In one embodiment, the offset of the platform 222 may be proportional to the highest component on the board that is to be reworked. In this regard, when the platform 222 contacts the component, the remainder of the contact plate 210 may be free from contact with the remainder (e.g., the highest component) of the PCB. The platform 222 may have a profile that corresponds to a component which is to be removed from the PCB. That is, the platform 222 may have a substantially identical outline or shape as a component which is to be removed such that when the contact plate 210 is brought in to contact with a component, the platform 222 may be the only portion of the contact plate 210 touching the component or any other portion of the PCB. As such, heat may be transferred by conducting heat directly to the component. As such, heat transferred into the component may be transferred directly to the component without a substantial amount of heat being directed to other components on the PCB adjacent to the component to be removed.

Furthermore, when the platform 222 is in contact with a component, a vacuum retention port 220 may be covered by the component. Accordingly, a vacuum produced at the vacuum retention port 220 while the platform 222 is in contact with a component may allow the component to be held against the platform 222. That is, the contact between the platform 222 and component may form a seal that allows a vacuum to act on the component at the vacuum retention port 220 to retain the component thereon by virtue of the vacuum holding the component to the platform 222.

Figure 4:
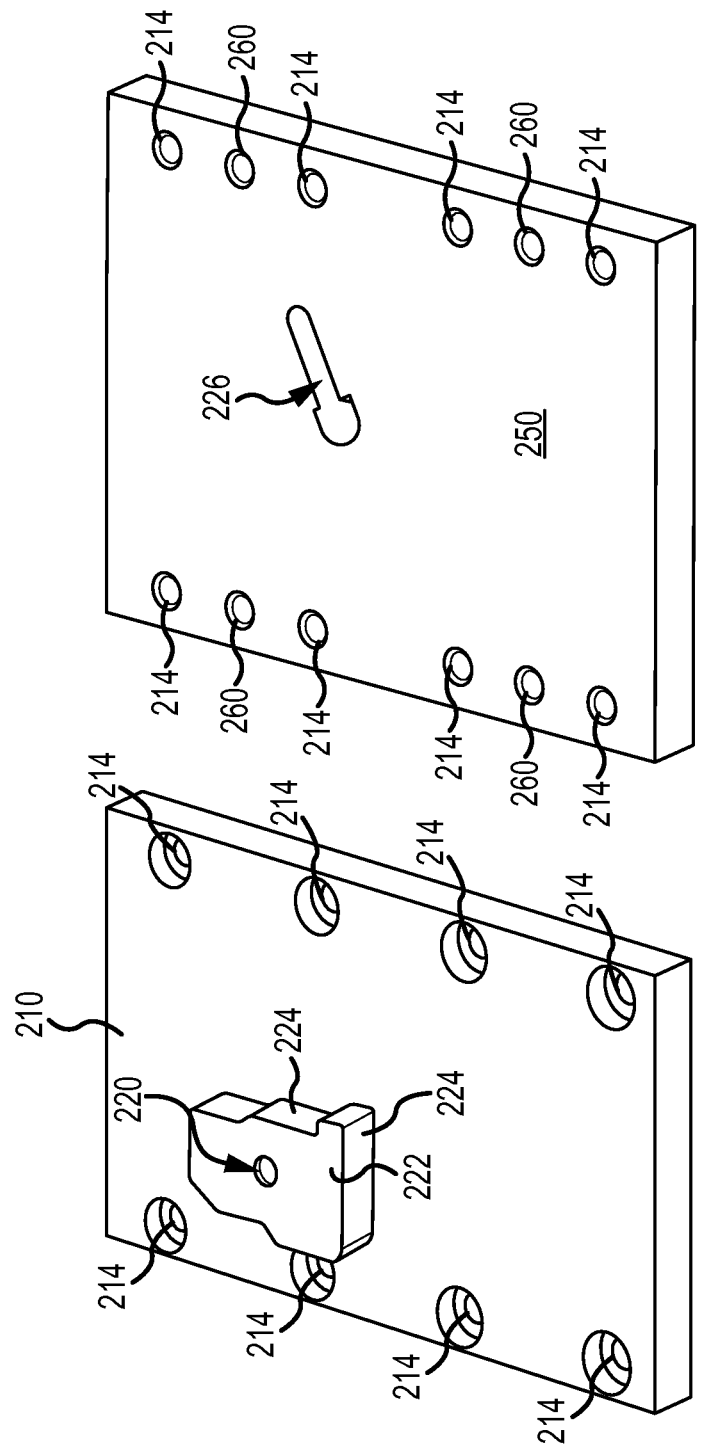
FIGS. 4A-B include a front side view and back side view of a contact plate.

Front and rear perspective views of the contact plate 210 are shown in FIGS. 4A and 4B respectively. In these front and rear perspective views, the vacuum retention port 220 as well as a channel 226 can be seen. The front view of the contact plate 210 in FIG. 4A includes a termination of the vacuum retention port 220 on the platform 222. The contact plate 210 may also include a channel 226 defined in the contact plate 210 for vacuum distribution. In this regard, the channel 226 may extend between the vacuum port 120 of the heating body 110 and the vacuum retention port 220 when the contact plate 210 is attached to the heating element body 110.

It may be advantageous to facilitate removal of components attached to a PCB that are at different locations on the PCB. Thus, contact plate bodies having platforms of different profiles at different locations may be selectively attached to the heating element body 110 based on the component to be removed. In this regard, the vacuum port 120 may be located on the heating element body 110 at a central location on the heating body 110. The channel 226 may be defined in the contact plate 210 in order to provide a passage between the vacuum port 120 on the heating element body 110 to a vacuum retention port 220 that is offset from the vacuum port 120. As removal of components at different locations and of different sizes on the PCB may be facilitated, different contact plates may be provided such that the platform 222 and vacuum retention port 220 may be at different relative locations on the contact plate 210 and the heating element body, respectively. The different platforms may also have different profiles for different components to be removed. The vacuum retention port 220 may be offset from the vacuum port 120, such that the channel 226 defined by the contact plate 210 may be provided in the contact plate 210 to link the vacuum retention port 220 and the vacuum port 120. In this regard, the channel 226 may provide for communication between the vacuum retention port 220 and the vacuum port 120.

Figure 5:
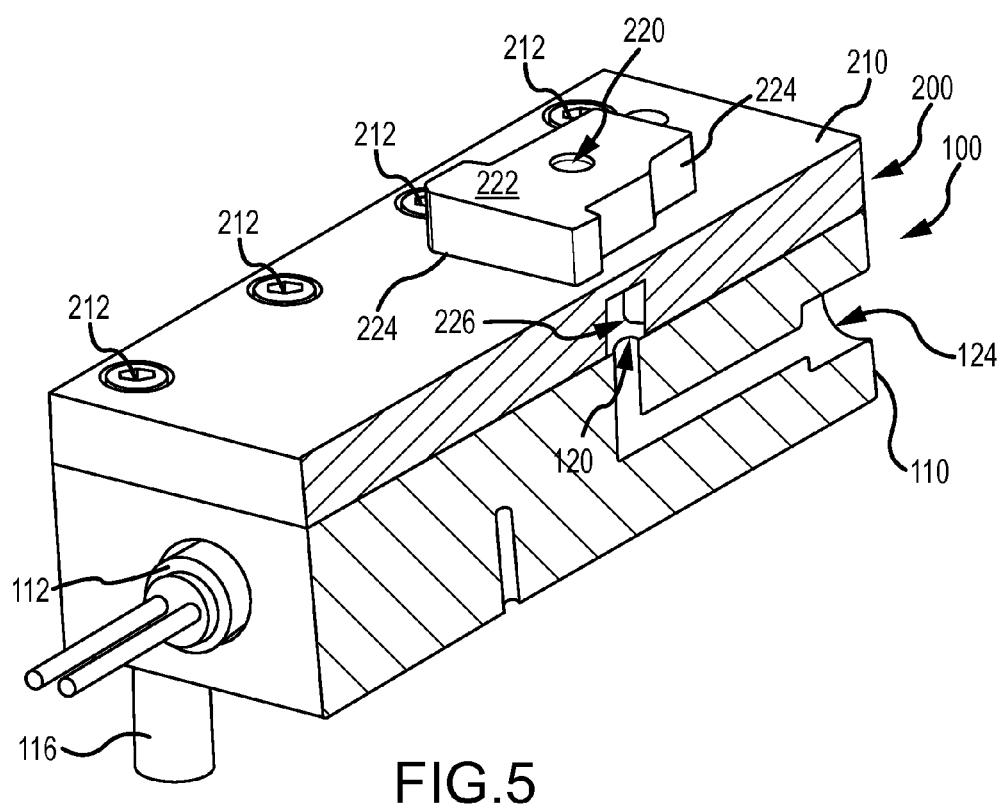
FIG. 5 is a cutaway perspective view of a heating element and contact plate assembly in an assembled state.

As further shown in the cutaway perspective view in FIG. 5, the channel 226 may be defined in the contact plate 210 between the vacuum port 120 and the vacuum retention port 220. When the contact plate 210 is attached to the heating element body 110, the channel 226 may be sealed such that there is little or no vacuum loss at the interface of the contact plate 210 and the heating element body 110. Furthermore, the heating element body 110 may include a vacuum inlet 124 extending through the heating element body 110 that may provide communication between the vacuum port 120 and a vacuum source. In this regard, a vacuum applied at the vacuum inlet 124 may result in a vacuum being applied throughout the vacuum port 120, the channel 226 and the vacuum retention port 220 (collectively the vacuum path).

Figure 6B:
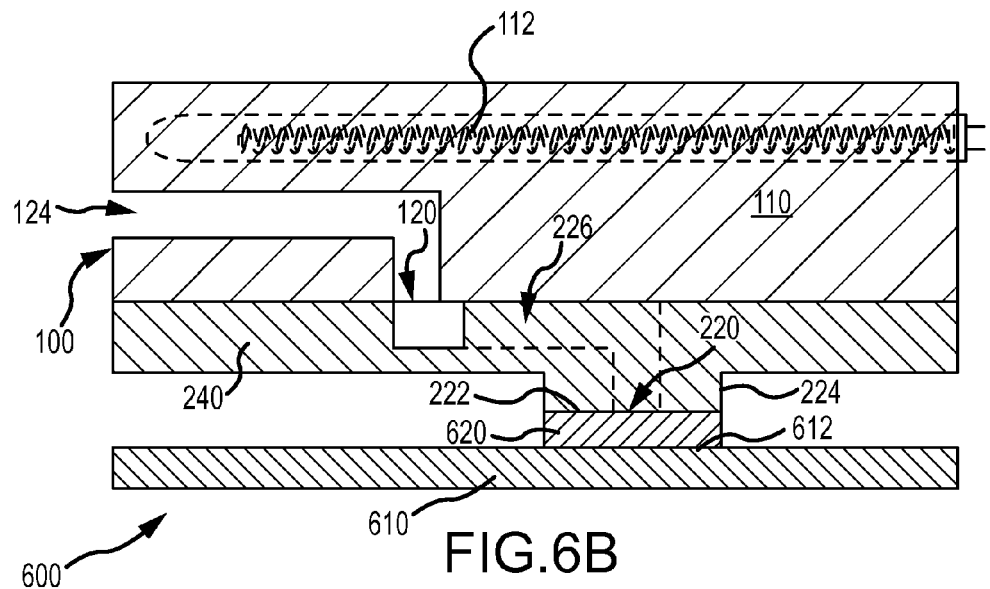
FIGS. 6A-B are cross-sectional views of a heating element assembly and attached contact plate assembly and a PCB from which a component is to be removed.
Figure 6C:
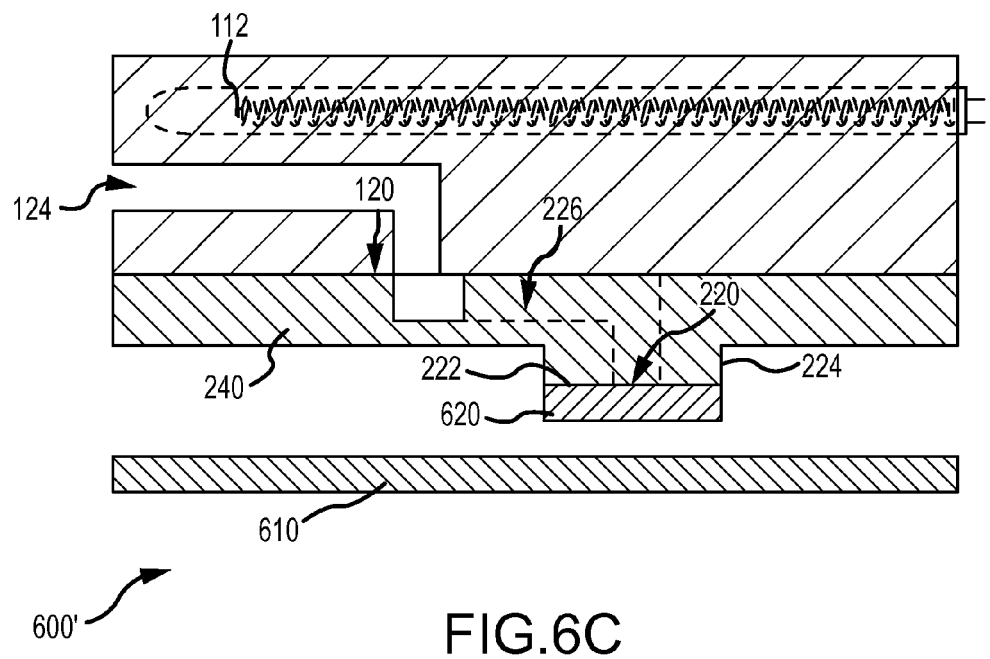

FIG. 6A shows an end view of a PCB assembly 600 in contact with a contact plate 240. While the PCB assembly 600 is depicted as only having one component 620, it will be understood that the PCB assembly 600 may further have additional components adjacent to or under the component 620. FIG. 6B is a cross section view taken along section line B-B in FIG. 6A. FIG. 6C shows the cross section of FIG. 6B once a component has been removed from the PCB 610. The contact plate 240 may have a different profile platform 222 provided at a different location such that a different length and/or shaped channel 226 may be provided based on a component 620 to be removed.

As may be appreciated in FIG. 6B, the profile of the platform 242 may be similar to that of the component 620 such that when the contact plate 240 contacts the component 620 only the raised platform 242 contacts the component 620. In this regard, upon activation of the heating element 112, heat may be conducted through the heating element body 110 as well as the contact plate 240. As such, the platform 242 in contact with the component 620 may result in heat being transferred directly by conduction to the component 620. As such, a solder connection 612 attaching the component 620 to the PCB 610 may also be heated such that the solder may be melted and the component 620 may be freed from the PCB.

Also, while the platform 242 is still in contact with the component 620, and the melting point of the solder forming the attachment to the component has been reached, a vacuum may be introduced at the vacuum inlet 124. In this regard, the vacuum may be communicated to the vacuum path. As the vacuum retention port 220 may terminate adjacent to the component 620, a vacuum at the vacuum retention port 220 may result in the component 620 being held against the platform 242.222. The force acting on the component 620 urging it against the platform 242 may be sufficient to overcome the surface tension from liquid solder. As such, the component 620 may be removed from the PCB 610.

In this regard, and as shown in FIG. 6C, the PCB 610 and the contact plate 240 and be moved with respect to one another. In that the solder connection 612 between a component 620 and the PCB 610 may have been melted as a result of heat application to the component 620, relative movement between the PCB 610 and the contact plate assembly 200 may result in the component 620 being removed from the PCB 610. This may be facilitated because a vacuum at the vacuum retention port 220 may hold the component 620 to the platform 242 by way of the vacuum acting on the component 620.

It will be understood that the PCB 610 may be moved away from the contact plate 240, the contact plate 240 may be moved away from the PCB 610, or both. In any regard, relative movement of the contact plate 240 and PCB 610 with vacuum pressure applied at the vacuum attention port 222 and the solder connection 612 being melted by action of the heating element 112 may result in the component 620 being removed from the PCB 610. Thus a PCB assembly 600' may result, wherein the component has been removed from the PCB, yet all other components remain without having been contacted by the contact plate 240.

Figure 7A:
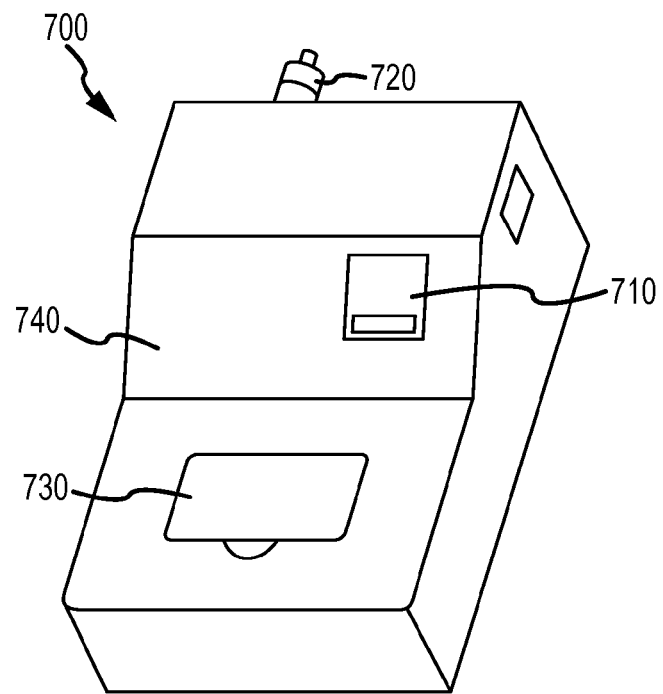
FIG. 7A-B are perspective views of one embodiment of an apparatus for removal of a component from a PCB.
Figure 7B:
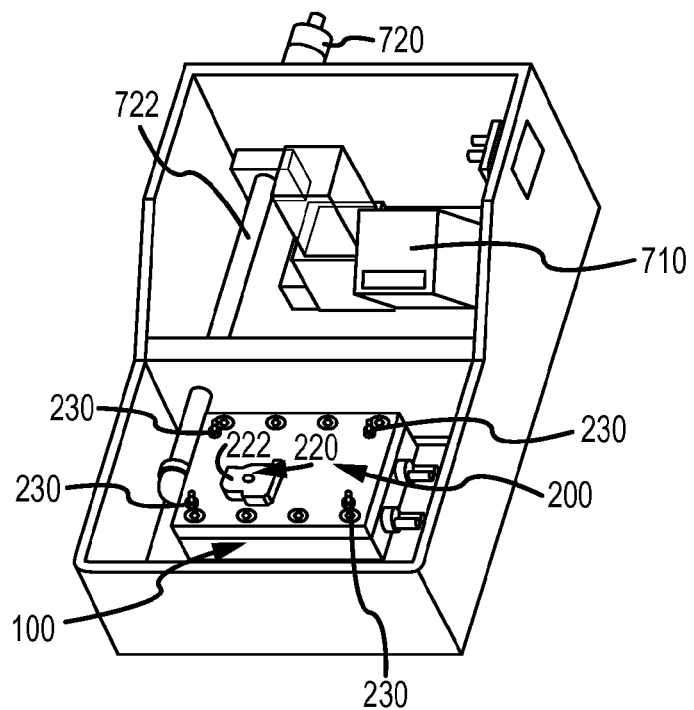

As shown in FIGS. 7A-B, a heating element assembly 100 and the contact plate assembly 200 may be incorporated into a device 700 for removal of a component from a PCB. Generally, a PCB 730 having a component to be removed attached thereto may be placed on the device 700 such that the component be removed is in contact with the contact plate 210 and specifically, the component may be in contact with the platform 222 of the contact plate 210 as described with reference to FIGS. 6A-B. The apparatus 700 may include a temperature control module 710 that is operative to control the heating elements 112 disposed in the heating element body 110. In this regard, a predetermined temperature may be established at the heating element body 110 such that the heating element body 110 and the contact plate 210 are maintained at the predetermined temperature. Alternatively, the heating elements 112 may be activated once the PCB is in contact with the contact plate assembly 210, however doing so may adversely impact cycle time.

Moreover, vacuum piping 722 may be provided between a vacuum source 720 and the heating element body 110. The vacuum piping 722 may be operative to link a vacuum inlet 124 (as shown in FIG. 5) of the heating element body 110 to a vacuum source 720. As such, the vacuum source 720 may be controlled to selectively create a vacuum at the vacuum inlet 124. The vacuum source 720 may be controlled in any way that selectively establishes a vacuum at the vacuum retention port 220 of the contact plate 210. For example, a control (e.g., a valve) may be provided in the vacuum piping 722 or elsewhere in the vacuum path, or an external control may be provided that allows for control over the creation of a vacuum at the vacuum inlet 124. In any regard, a vacuum is selectively established at the vacuum retention port such that a component may be held against a platform 222 of the contact plate 210.

In this instance, insulation may be provided such that the heating element body 110 does not transfer a substantial amount of heat to the device chassis to prevent damaging the chassis. Also, PCB supports 230 may be provided on the contact plate 210 to support the PCB 730 when in contact with the contact plate 210. The PCB supports 230 may also be insulating such that the supports do not transfer heat from the contact plate 210 to the PCB 730.

When operating the device 700, an operator may position a PCB 730 with the component to be removed facing the contact plate 210. The PCB 730 may rest on the PCB supports 230 such that the component to be removed is aligned with and contacts the platform 222 of the contact plate 210. The heating element body 110 may be at a predetermined temperature as regulated by the heating elements 112 such that the contact plate 210 and the platform 222 are at the predetermined temperature. Upon contacting the component to the platform 222, heat may be transferred to the component by conductive heating. This may result in a solder attachment holding the component to the PCB to undergo a phase change and melt. In this regard, the component may be freed from the PCB 730.

After a predetermined amount of time (e.g., enough time to ensure the solder attaching the component has melted but not enough time to transfer a significant amount of heat to the remainder of the PCB so as to prevent solder joint defects in adjacent components), a vacuum source 720 may be controlled such that a vacuum is introduced in the vacuum piping 722. In this regard, low-pressure may be developed in the vacuum piping 722, the vacuum port 120, channel 226, and the vacuum retention port to 220. In that the component may be in contact with the platform 222 and may cover the vacuum retention port 220, vacuum introduced at the vacuum retention port 220 may result in the component forming a seal with the platform 222 and the component may be held against the platform 222 by way of the vacuum acting on the component at the vacuum retention port 220. The PCB 730 may be lifted from the apparatus 700. Because the component may be free from the PCB 730 by virtue of the melting of the attachment solder, the component may remain in place against the platform 222 due to the vacuum interaction at the interface of the component and the platform 222 when the PCB 730 is lifted from the device 700. Thus, the component may be removed from the PCB 730. The vacuum source 720 may be controlled such that the vacuum present at the vacuum retention port 220 may be terminated and the component may be released.

Figure 8:
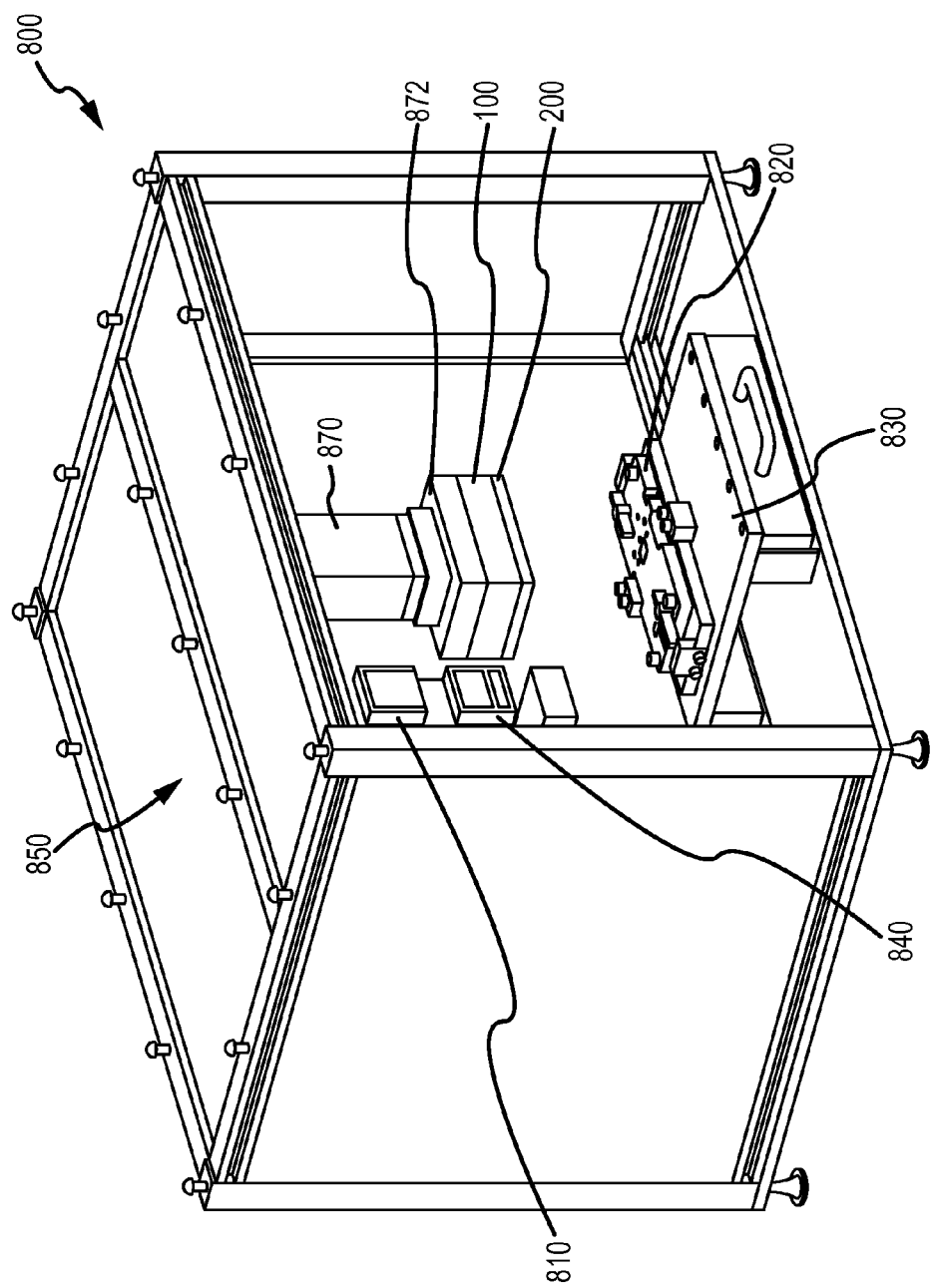
FIG. 8 is a perspective view of another embodiment of a system for removal of a component from a PCB.

FIG. 8 shows an alternative embodiment of a system 800 for removing a component from a PCB. The system 800 generally operates in the same manner to free a component and retain the component. That is, the system 800 may include a heating element assembly 100 and contact plate assembly 200 similar to those described above. Additionally, the system 800 may include an actuator 870 to which the heating element assembly 100 is attached. The system 800 may also include a PCB holder 820 mounted to a sliding platform 830. The system 800 may have a temperature controller 840 as well as a timer 810 to facilitate control over the system 800. A utility compartment 850 may be provided to house components of the system 800 that do not need to be regularly accessed by an operator. Examples of components house din the utility compartment 850 may include a controller (e.g., a PLC logic controller), a vacuum source or vacuum controller, power supplies, and other equipment such as pneumatic valves and the like.

The actuator 870 to which the heating assembly 100 may be attached may be operative to move the heating element assembly 100 and contact plate assembly 200 with respect to a PCB holder 820. The actuator 870 may be a pneumatic actuator capable of producing linear motion with respect to the PCB holder 820. In this regard, the actuator 870 may be used to move the contact plate assembly 200 and heating element assembly 100 with respect to a PCB held in the PCB holder 820 such that the contact plate assembly 200 contacts the component to be removed from the PCB similar to the arrangement shown in FIG. 6A. The actuator 870 may also be moved with respect to the PCB holder 820 such that the contact plate assembly 100 is moved away from a PCB held by the PCB holder 820. In this regard, similar to the embodiments discussed above, a vacuum may be established at a vacuum retention port on the contact plate assembly 200. This may allow the component to be held against a platform of the contact plate. Upon freeing (e.g., melting of the solder) of the component, movement of the actuator 870 away from the PCB while the component is held against the platform using a vacuum may allow the component to be removed from the PCB.

Figure 9:
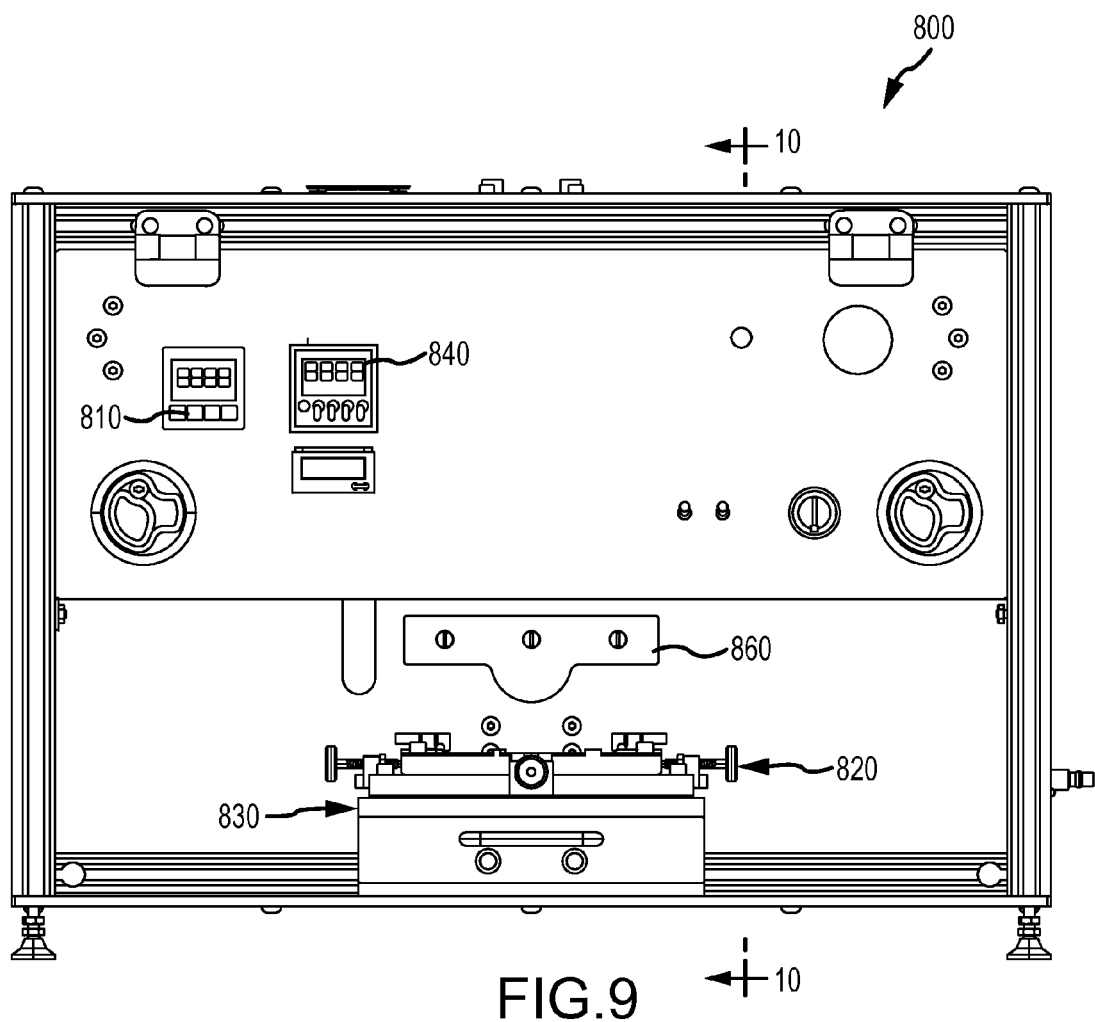
FIG. 9 is a front elevation view of the system shown in FIG. 8.
Figure 10A:
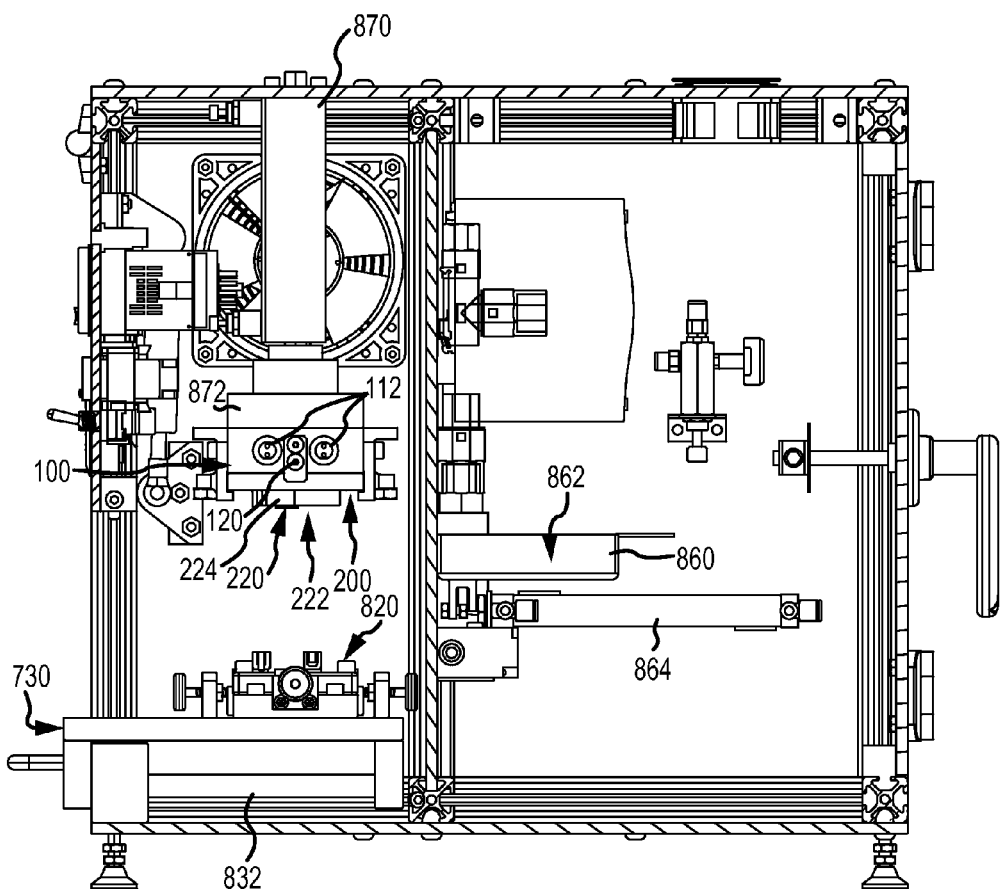

FIG. 9 is a front elevation view of the system 800. FIG. 10A-B are section views taken along section line 10 in FIG. 9. FIG. 10A shows a PCB holder 820 in a work position and FIG. 10B shows a PCB holder 820 in a loading position. The actuator 870 may include insulating material 872 between the actuator 870 and the heating element assembly 100. The actuator 870 may be disposed above a PCB holder 820 when the PCB holder 820 is in a work position as shown in FIG. 10A. The PCB holder 820 may be moved between a work position shown in FIG. 11 and a loading position, wherein the sliding platform 830 is moved transversely to the direction of motion of the actuator 870 such that a user may access the PCB holder 820. The PCB may be placed on and held in place by the PCB holder 820 as will be described below. The PCB holder 820 may be moved from the loading position to the work position shown in FIG. 10A such that the PCB holder 820 is disposed below the actuator 870.

In operation, the PCB holder 820 may be moved on slide 832 such that the PCB holder 820 is disposed in the loading position as shown in FIG. 10B and may be more easily accessed by an operator. The operator may load a PCB into the PCB holder 820. The PCB holder 820 may be moved to the working position shown in FIG. 10A. The return of the PCB holder 820 to the position shown in FIG. 10A may trigger the actuator 870 to be lowered toward the PCB holder 820. The lowering of the actuator 870 may bring the contact plate assembly 200 into contact with the PCB as described above with regard to FIG. 6A. The timing controller may maintain the contact plate assembly 200 in contact with the PCB for a predetermined amount of time such that a soldered connection of a component may be melted. A vacuum source may be activated such that vacuum is introduced to a vacuum retention port such that the detached component is held in place against the contact plate assembly 200. The actuator 870 may be moved away from the PCB holder 820 such that the PCB is held in place by the PCB holder and the component travels with the contact plate assembly 200. Thus, the component may be removed from the PCB.

Once the actuator 870 has moved away from the PCB holder 820, a component disposal drawer 860 may be moved from a retracted position as shown in FIG. 10A by a pneumatic cylinder 864 such that the component disposal drawer 860 may be placed generally below the contact plate assembly 200. The vacuum holding the component to the contact plate assembly 200 may be released and the component may be allowed to fall into the component disposal drawer 860. The component disposal drawer 860 may be retracted back to the position shown in FIG. 10A. Thus, the component may be removed from the contact plate assembly 200 and the process may resume with another PCB to which a component is attached being loaded into the PCB holder 820.

Figure 11:
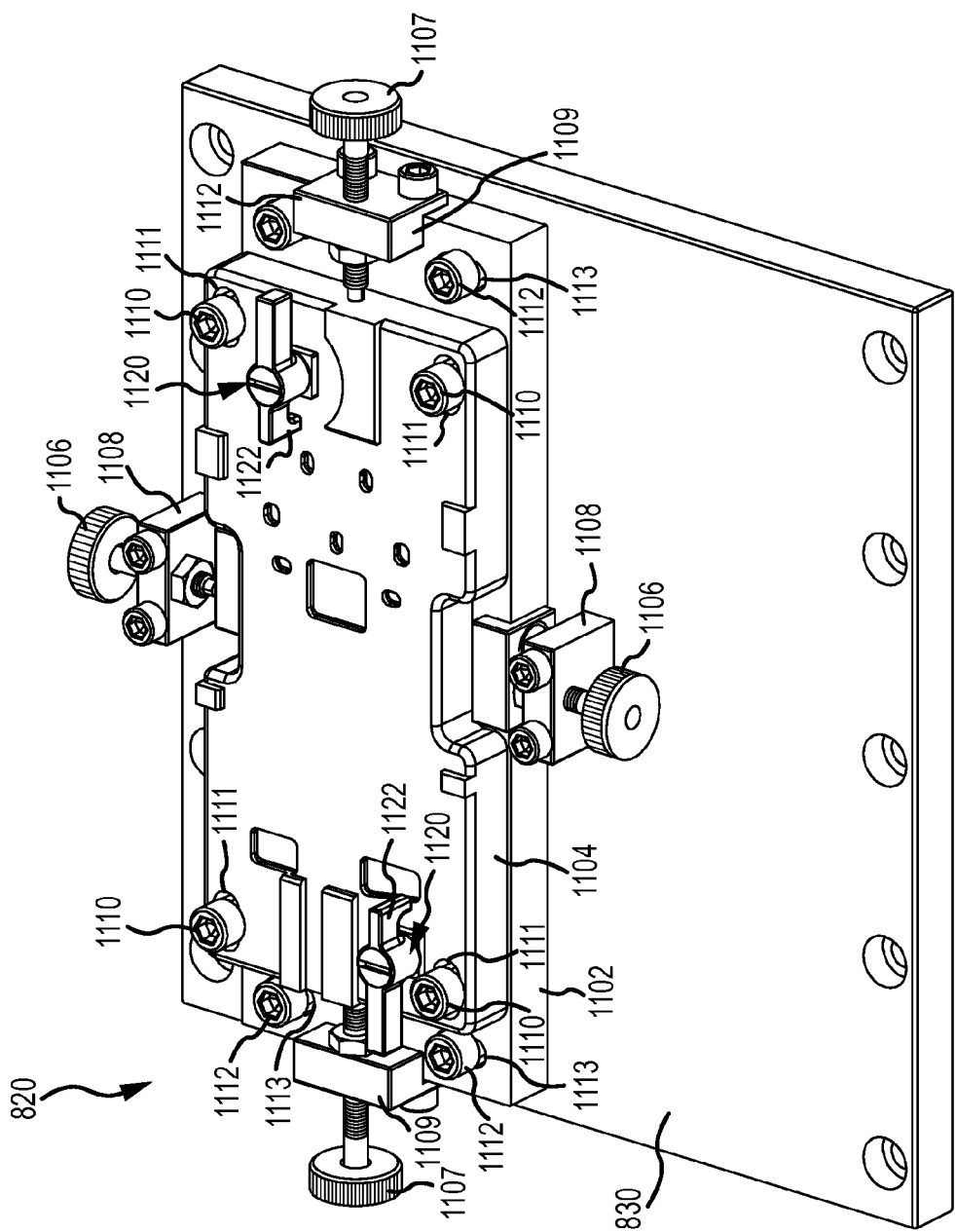
FIG. 11 is a perspective view of a PCB holder that may be used in the system depicted in FIG. 8.

FIG. 11 is a perspective view of the PCB holder 820 that may be mounted to the sliding platform 830. The PCB holder 820 may include a first platform 1102 and a second platform 1104. The first platform 1102 may be affixed to the slide platform 830 by way of fasteners 1112 passing through slots 1113. The slots 1113 may allow for movement of the first platform 1102 with respect to the slide platform 830. That is, the fasteners 1112 may be loosened and thumbwheels 1106 be threaded into or out of blocks 1108 such that the first platform 1102 slides in a direction corresponding to the length of the slot 1113.

Additionally, the second platform 1104 may also be attached to the first platform 1102 by way of fasteners 1110. The fasteners 1110 may pass through slots 1111. When fasteners 1110 are loosened, thumbwheels 1107 may be threaded into or out of blocks 1109 to produce lateral movement of the second platform 1104 in a direction along the length of slots 1111 and generally orthogonally to that of the first platform 1102.

The PCB holder 820 may also include PCB retention arms 1122. The PCB retention arms 1122 may include a resilient member that provides a biasing force that urges a PCB against the PCB holder 820. The PCB retention arms 1122 may be attached to posts 1120 that space the PCB retention arms 1122 from the second platform 1104. In this regard, a PCB may be placed on the second platform 1104 and PCB retention arms 1122 may be moved with respect to the PCB to urge the PCB against the second platform 1104. As such, the PCB may be held in place on the PCB holder 820. The adjustment of the first platform 1102 and second platform 1104 may allow for adjustment such that the PCB may be positioned with respect to the contact plate assembly 200 when lowered by the actuator 870. In this regard, the PCB may be positioned such that only the component to be removed is contacted by the platform 222 having a profile substantially similar to the competent to be removed.

The embodiments presented herein may be advantageous over prior systems in that the embodiments presented herein may facilitate reduction or prevention of solder joint connections and other defects that PCBs are susceptible to sustaining when removing components for rework. As the component to be removed is heated by way of direct conductive heating, excess heat is less likely to affect adjacent components that do not need to be removed. Unlike forced hot air heating, the control of heat transfer to the component facilitates heating of the component without subjecting adjacent components to heat that may lead to solder joint defects and other issues with excess heat. As such, the component may be removed without the intervention of highly skilled workers utilizing expensive machines. Furthermore, the embodiments presented herein allow for removal of a component while heating without the need for an operator to physically manipulate the component to be removed with tweezers or other implements. Rather, a vacuum is used to remove the component, thus lessening the risk that the component or adjacent components are subjected to damage.

Further still, the embodiments presented herein may provide for automation of the rework process such that the cost associated with the rework process may be reduced. As stated above, the embodiments presented may facilitate rework by operators without highly developed skill sets. Furthermore, the cycle time associated with component removal may be significantly reduced from a system using forced hot air and tweezers to remove a component.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for removing a component attached to a PCB from said PCB, comprising:
   contacting said component with a contact plate in thermal communication with a heating element such that a vacuum retention port of a channel including at least one jog and extending through said contact plate to a vacuum port is covered by said component, wherein the contact plate comprises a platform extending from said contact plate that has a substantially identical profile as said component;
   melting solder attaching said component to said PCB in response to said contacting;
   creating a vacuum at said vacuum retention port such that said component is held against said contact plate by said vacuum; and
   moving said contact plate with respect to said PCB during said creating such that said component is retained on said contact plate and removed from said PCB.

2. The method of claim 1, wherein said component is an electro-magnetic shield.

3. The method of claim 2, wherein said electro-magnetic shield is a radio-frequency (RF) shield.

4. The method of claim 1, further comprising:
   selecting a contact plate from a plurality of different contact plates.

5. The method of claim 3, further comprising:
   removably attaching said contact plate to said heating element.

6. The method of claim 5, wherein said removably attaching includes clamping said contact plate to said heating element using a lever-actuated clamping mechanism.

7. A method for removing a component attached to a PCB from said PCB, comprising:
   removably attaching a contact plate to a heating element in thermal communication therewith using a lever-actuated clamping mechanism;
   contacting said component with said contact plate such that a vacuum retention port extending through said contact plate is covered by said component, wherein the contact plate comprises a platform extending from said contact plate that has a substantially identical profile as said component, and wherein no other portion of said PCB or component is contacted by said contact plate other than said platform;
   melting solder attaching said component to said PCB in response to said contacting;
   creating a vacuum at said vacuum retention port such that said component is held against said contact plate by said vacuum; and
   moving said contact plate with respect to said PCB during said creating such that said component is retained on said contact plate and removed from said PCB,
   wherein said component is an radio-frequency (RF) electro-magnetic shield.

8. The method of claim 1, further comprising operating a temperature control module to control said heating element.

9. The method of claim 1, further comprising resting said PCB with the component facing said contact plate on PCB supports.

10. The method of claim 1, further comprising placing said PCB on a PCB holder configured to move from a loading position to a work position such that said PCB holder is disposed below an actuator configured to lower said contact plate into contact with said PCB.

11. The method of claim 1, further comprising releasing said component into a component disposal drawer.

* * * * *

UNITED STATES PATENT AND TRADEMARK OFFICE
CERTIFICATE OF CORRECTION

PATENT NO. : 8,627,997 B2  
APPLICATION NO. : 13/356385  
DATED : January 14, 2014  
INVENTOR(S) : Dason Cheung et al.

Page 1 of 1

It is certified that error appears in the above-identified patent and that said Letters Patent is hereby corrected as shown below:

In the Specification

At column 5, line 12, please replace "FIGS. 6A-B" with "FIGS. 6A-C" such that the phrase is "FIGS. 6A-C are cross-sectional views".

Signed and Sealed this  
Fifteenth Day of April, 2014

Michelle K. Lee  
*Deputy Director of the United States Patent and Trademark Office*